UNITED STATES PATENT OFFICE.

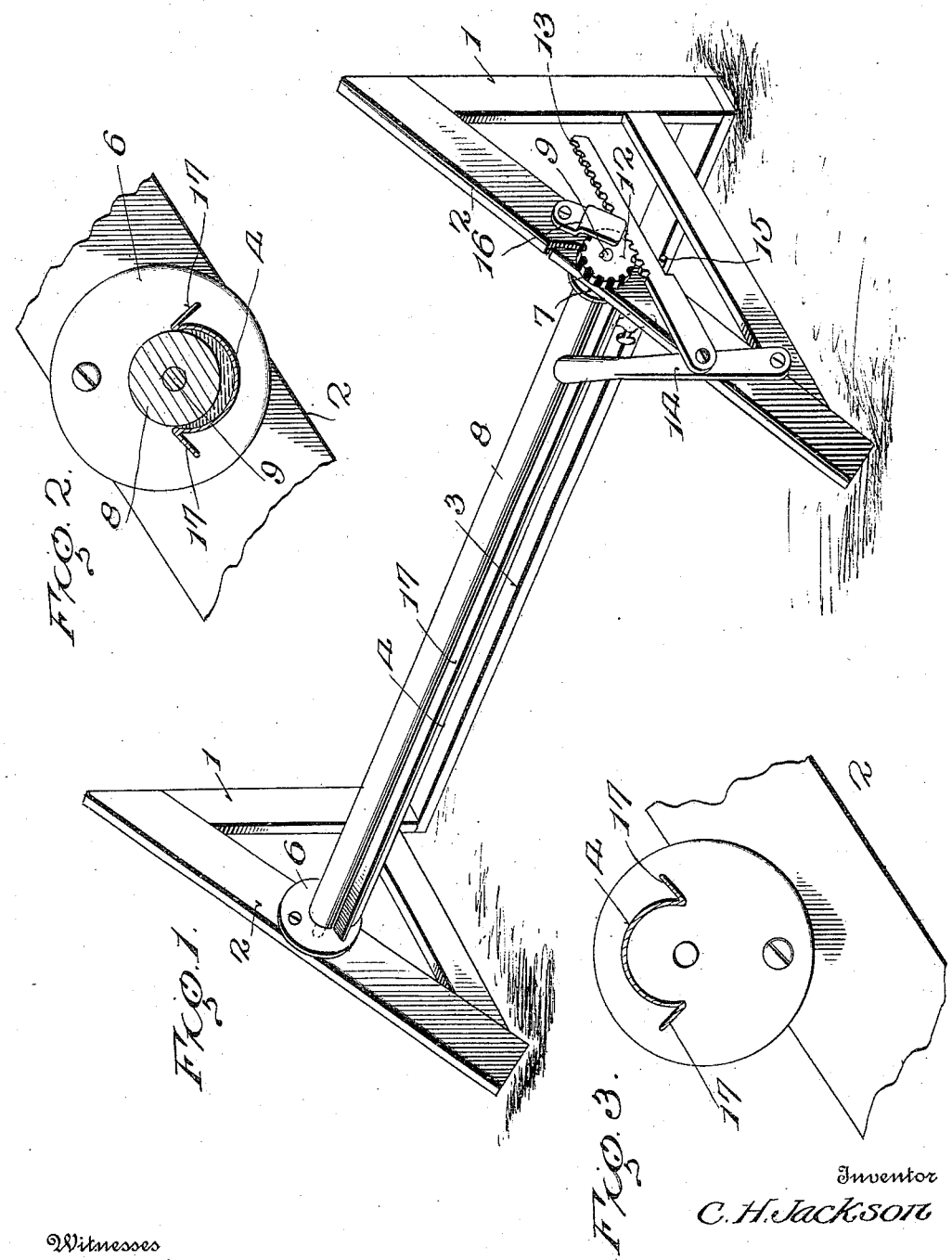

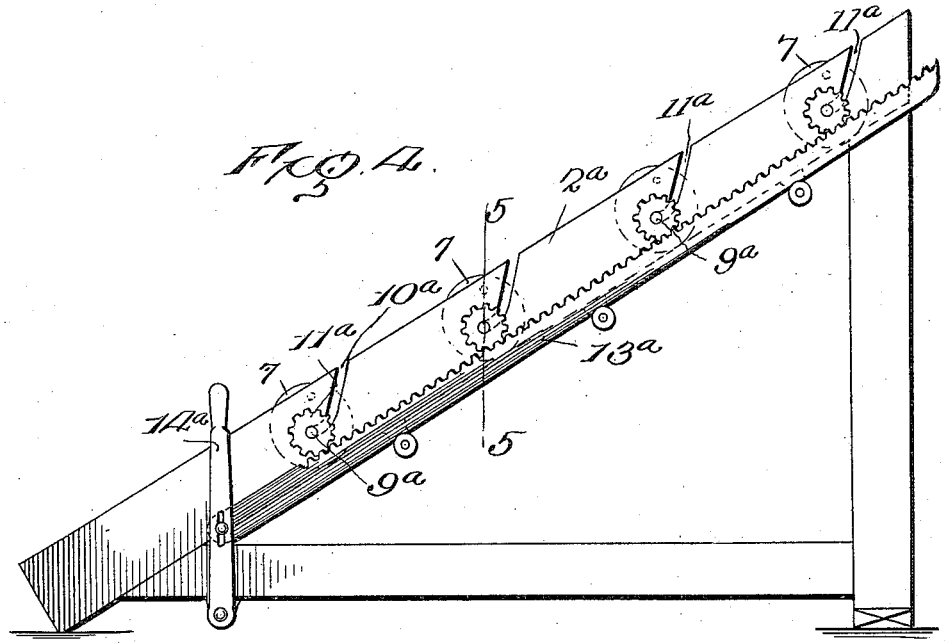
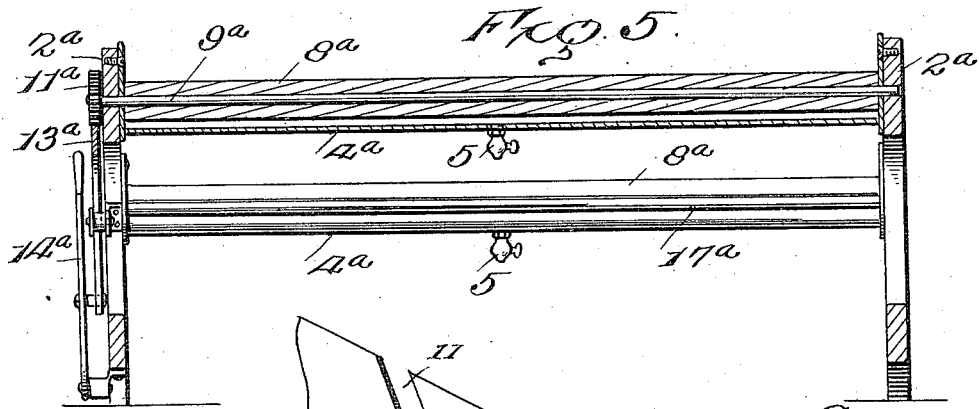
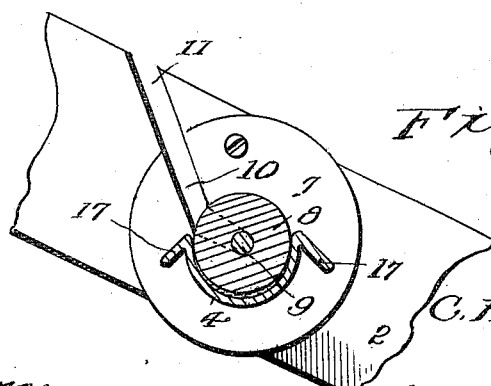

CHARLES H. JACKSON, OF JETMORE, KANSAS.

POULTRY-ROOST.

985,595.

Specification of Letters Patent. Patented Feb. 28, 1911.

Application filed January 19, 1910. Serial No. 538,839.

*To all whom it may concern:*

Be it known that I, CHARLES H. JACKSON, citizen of the United States, residing at Jetmore, in the county of Hodgeman and State of Kansas, have invented certain new and useful Improvements in Poultry-Roosts, of which the following is a specification.

This invention relates to the care of live stock and more particularly to poultry roosts of the sanitary or insecticide carrying type, and the invention has for its primary object, a simple, durable and efficient construction of device of this character which is arranged to contain an insecticide for the purpose of killing the vermin or insects which infest the fowls.

The invention also has for its object a device of this character which embodies a rotatable perch, arranged partially within an insecticide carrying trough and adapted to be turned at will so as to apply the insecticide to all parts of the perch as often as desired. And the invention further has for its object, an improved device of this character the parts of which may be easily cleansed.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view of one form or embodiment of my invention; Fig. 2 is a transverse sectional view thereof on an enlarged scale; Fig. 3 is a view illustrating one of the hangers for the trough, the hanger being shown in an inverted position and the trough being shown in section; Fig. 4 is a side elevation of a modified form of the invention. Fig. 5 is a transverse sectional view of said modified form, the section being taken approximately on the line 5—5 of Fig. 4. Fig. 6 is a detail sectional view.

Corresponding and like parts are referred to in the following description and indicated in all the views of the drawings by the same reference characters.

Referring to the drawings, the numeral 1 designates the framework of my improved poultry roost, said framework being of any desired construction and design and capable of being folded up or arranged in any position if desired, and embodying in the present instance two side frames 2 connected together by one or more cross bars 3.

4 designates a trough of which there may be any desired number, said trough being designed to carry the insecticide which may be applied thereto in any desired way. Preferably the trough 4 is composed of galvanized iron or the like, and has a drain plug 5, the bottom wall of the trough tapering toward the middle where the drain plug is preferably located. The trough may be pivotally connected to the side frames 2 in any desired manner, as for instance by hanger disks 6 and 7 pivotally secured eccentrically to the opposing faces of the side frames 2 so that the trough may be swung around to an inverted position and thoroughly cleansed after the roller or round support 8 which constitutes the perch proper has been removed.

As I recognize that a perch which is round in cross section is better than a square or flat form of perch, as the former will conform to the natural bend or crook of the chickens' claws, I have formed a perch of such shape and provided at its ends with gudgeons 9 by which it is rotatably mounted in the hanger disks 6 and 7, being partially embedded in the trough 4, but having a portion of its periphery exposed. One of the gudgeons 9 is set in a slot 10 formed in the hanger disk 7 and being slipped therein when the slot 10 of said disk registers with a corresponding slot 11 formed in the adjacent side frame 2.

In order to rotate the perch 8 I have in the present instance provided a spur pinion 12 which is secured to the extended gudgeon 9 and which is designed to mesh with a rack bar 13 secured to one end of a hand lever 14, said hand lever being fulcrumed on one of the side frames 2. In the present embodiment of my invention, although the invention is not limited thereto, the rack bar 12 is guided in its movement between a pin 15 projecting outwardly from one of the side frames 2 and a metallic bracket or strap 16 secured to said side frame and projecting over the outer face of the spur pinion 12 as well as the rack bar so as to assist in holding both of these parts in place.

From the foregoing description in connection with the accompanying drawings, it is believed that the operation of my improved poultry roost will be apparent. In the practical use of the device, the trough 4 is filled to the proper extent with preferably liquid insecticide and the perch is then inserted in place. In order that all parts of the periphery of said perch may be properly medicated, the means for rotating the perch are provided, and it is clear that by merely manipulating the hand lever 14 the roller may be easily turned as often as desired to effect this result. Preferably, the trough 4 is formed at its side edges with oppositely extending and downwardly sloping deflector flanges 17, as clearly illustrated in the drawing.

It is to be understood that my invention is not limited to a single perch, but also contemplates a plurality of perches all manipulated by the same handle lever. An example of this modification is illustrated in Fig. 4, wherein the troughs 4ª and the perches 8ª are ranged in an inclined series between the side frames 2ª, being mounted and constructed like the perches and troughs as herein described and being all simultaneously rotated by means of a rack bar 13ª secured at one end to a hand lever 14ª and meshing with spur pinions 11ª on the extended gudgeons 9ª of the perches or rollers 8ª.

Having thus described the invention, what is claimed as new is:

1. A poultry roost embodying a framework, a trough supported in said framework, a rotatable perch journaled in the framework and arranged with a portion of its periphery in the trough, a spur pinion movable with the perch, a hand lever fulcrumed on the frame work and a rack bar connected to said hand lever and meshing with said pinion.

2. A poultry roost embodying a framework, a tiltable trough mounted in said framework, and a rotatable perch journaled in the framework and extending into the trough.

3. A poultry roost embodying a supporting framework, a trough mounted in said framework and pivoted at one end thereto, and a rotatable perch journaled in the framework and arranged to extend into the trough.

4. A poultry roost embodying a supporting framework, a trough pivoted at one end in the framework and detachably connected at its other end thereto, and a rotatable perch journaled in the framework above the trough and arranged to extend into the same.

5. A poultry roost embodying a supporting framework, a trough mounted in the framework, a rotatable perch provided at its ends with gudgeons one of which is journaled in the framework and the other of which is journaled in a recess in the framework, a spur pinion secured to said last named gudgeon, a hand lever fulcrumed on the framework, a rack bar connected to said handle and meshing with said pinion, a pin projecting from the framework and engaging one edge of the rack bar and a strap or bracket secured to the framework and overlapping the rack bar and pinion as and for the purpose set forth.

In testimony whereof I affix my signature in presence of two witnesses.

CHARLES H. JACKSON. [L. S.]

Witnesses:
J. SOREM,
JOHN LENOX.

---

Copies of this patent may be obtained for five cents each, by addressing the "Commissioner of Patents, Washington, D. C."